(12) United States Patent
Wright

(10) Patent No.: US 9,824,012 B2
(45) Date of Patent: Nov. 21, 2017

(54) PROVIDING COHERENT MERGING OF COMMITTED STORE QUEUE ENTRIES IN UNORDERED STORE QUEUES OF BLOCK-BASED COMPUTER PROCESSORS

(71) Applicant: QUALCOMM Incorporated, San Diego, CA (US)

(72) Inventor: Gregory Michael Wright, Chapel Hill, NC (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 14/863,577

(22) Filed: Sep. 24, 2015

(65) Prior Publication Data

US 2017/0091102 A1    Mar. 30, 2017

(51) Int. Cl.
*G06F 12/00*     (2006.01)
*G06F 13/00*     (2006.01)
(Continued)

(52) U.S. Cl.
CPC ........ *G06F 12/0833* (2013.01); *G06F 9/3834* (2013.01); *G06F 9/3855* (2013.01);
(Continued)

(58) Field of Classification Search
CPC .. G06F 12/08; G06F 12/0802; G06F 12/0804; G06F 12/0806; G06F 12/0808; G06F 12/0811; G06F 12/0813; G06F 12/0815; G06F 12/0817; G06F 12/082; G06F 12/0822; G06F 12/0824; G06F 12/0826; G06F 12/0828; G06F 12/0831;
(Continued)

(56) References Cited

U.S. PATENT DOCUMENTS 5,202,972 A  *  4/1993  Gusefski ............... G06F 12/084
                                                        711/120
6,854,075 B2    2/2005  Mukherjee et al.
                (Continued)

OTHER PUBLICATIONS

Hybrid Dataflow/von-Neumann Architectures; Yazdanpanah et al; IEEE Transactions on Parallel and Distributed Systems, vol. 25, iss. 6; Jun. 2014; pp. 1489-1509 (21 pages).*

(Continued)

*Primary Examiner* — Daniel C Chappell
(74) *Attorney, Agent, or Firm* — W&T/Qualcomm

(57) ABSTRACT

Providing coherent merging of committed store queue entries in unordered store queues of block-based computer processors is disclosed. In one aspect, a block-based computer processor provides a merging logic circuit communicatively coupled to an unordered store queue and cache memory. The merging logic circuit is configured to select a first store queue entry in the unordered store queue, and read its memory address, an age indicator, and a data value. The age indicator and the data value are stored in merged data bytes within a merged data buffer. The merging logic circuit then locates a remaining store queue entry having a memory address identical to the first selected store queue entry, and reads its age indicator and data value. Based on the age indicator and one or more age indicators of the merged data bytes within the merged data buffer, the data value is merged into the merged data buffer.

24 Claims, 11 Drawing Sheets

(51) Int. Cl.
*G06F 13/28* (2006.01)
*G06F 12/0831* (2016.01)
*G06F 12/128* (2016.01)
*G06F 12/123* (2016.01)
*G06F 12/0855* (2016.01)
*G06F 9/38* (2006.01)

(52) U.S. Cl.
CPC ........ *G06F 12/0855* (2013.01); *G06F 12/123* (2013.01); *G06F 12/128* (2013.01); *G06F 2212/621* (2013.01); *G06F 2212/69* (2013.01)

(58) Field of Classification Search
CPC .. G06F 12/0833; G06F 12/0835; G06F 12/12; G06F 12/121; G06F 12/122; G06F 12/123; G06F 12/124; G06F 12/125; G06F 12/126; G06F 12/127; G06F 12/128; G06F 2212/27; G06F 2212/30; G06F 2212/45; G06F 2212/60; G06F 2212/62; G06F 2212/621; G06F 2212/622; G06F 2212/69; G06F 9/00–9/3557; G06F 9/38–9/3834; G06F 9/3836–9/3855; G06F 9/3857–9/3897
See application file for complete search history.

(56) References Cited

U.S. PATENT DOCUMENTS

| | | | |
|---|---|---|---|
| 7,263,585 B2* | 8/2007 | Hooker | G06F 9/3812 711/119 |
| 7,434,040 B2* | 10/2008 | Bayh | G06F 5/01 712/300 |
| 7,849,290 B2 | 12/2010 | Cypher et al. | |
| 7,877,630 B1* | 1/2011 | Favor | G06F 11/3636 714/20 |
| 7,996,662 B2* | 8/2011 | Lien | G06F 9/30094 712/244 |
| 8,024,522 B1* | 9/2011 | Favor | G06F 9/3004 711/118 |
| 8,656,103 B2 | 2/2014 | Yang et al. | |
| 8,713,263 B2 | 4/2014 | Bryant | |
| 8,874,680 B1* | 10/2014 | Das | H04L 67/1095 709/212 |
| 8,977,823 B2 | 3/2015 | Alexander et al. | |
| 9,520,192 B2* | 12/2016 | Naeimi | G06F 12/0811 |
| 2008/0059765 A1 | 3/2008 | Svendsen et al. | |
| 2009/0013135 A1* | 1/2009 | Burger | G06F 9/3824 711/154 |
| 2009/0282225 A1* | 11/2009 | Caprioli | G06F 9/3826 712/225 |
| 2010/0153655 A1* | 6/2010 | Cypher | G06F 9/3851 711/139 |
| 2010/0293347 A1 | 11/2010 | Luttrell | |
| 2012/0079488 A1 | 3/2012 | Phillips et al. | |
| 2015/0019803 A1* | 1/2015 | Miller | G06F 3/0611 711/105 |
| 2015/0134932 A1* | 5/2015 | Mcnairy | G06F 9/30076 712/37 |
| 2016/0364239 A1* | 12/2016 | Lechenko | G06F 9/3824 |

OTHER PUBLICATIONS

Late-binding: enabling unordered load-store queues; Sethumadhavan et al; Proceedings of the 34th annual international symposium on Computer architecture; Jun. 9-13, 2007; pp. 347-357 (11 pages).*
International Search Report and Written Opinion for PCT/US2016/051269, dated Jan. 4, 2017, 11 pages.
Sethumadhavan, Simha et al., "Late-Binding: Enabling Unordered Load-Store Queues," Proceedings of the 34th annual international symposium on Computer architecture, ACM SIGARCH Computer Architecture News, vol. 35, Issue 2, May 2007, pp. 347-357.
Second Written Opinion for PCT/US2016/051269, dated Aug. 18, 2017, 6 pages.

* cited by examiner

PROVIDING COHERENT MERGING OF COMMITTED STORE QUEUE ENTRIES IN UNORDERED STORE QUEUES OF BLOCK-BASED COMPUTER PROCESSORS

BACKGROUND

I. Field of the Disclosure

The technology of the disclosure relates generally to unordered store queues in block-based computer processors.

II. Background

Modern out-of-order (OOO) computer processors, which support processing of computer program instructions in an order other than a program order of the computer program instructions, provide a structure referred to as a store queue. The store queue stores information regarding store operations (e.g., their associated memory addresses and data) to allow correct memory ordering to be maintained in the block-based computer processor. For example, store instructions may be dispatched out of program order, even though they affect the same memory address. In this scenario, the store queue enables the block-based computer processor to resolve the order in which the store instructions should be processed in order to maintain data coherency and consistency. In some OOO processors, the same queue may be used to store and process both load and store operations, and thus may be referred to as a load/store queue (LSQ).

In a conventional store queue (implemented as, e.g., a circular buffer), the physical order of store queue entries in the store queue represents the relative order in which the store instructions associated with the store queue entries are decoded. In some circumstances, however, it may be desirable to employ an "unordered" store queue, which allows entries for store instructions to be allocated out-of-order (e.g., at execution of each instruction rather than at decoding) into any available store queue entry within the store queue. This may be advantageous in some situations by reducing the time that a store queue entry spends in the store queue, and by allowing the store queue to be banked based on address.

However, an unordered store queue may pose challenges in "draining" committed store queue entries (i.e., outputting the contents of the committed store queue entries to a memory or cache and de-allocating the committed store queue entries, after the associated store instructions have been committed). In particular, a block-based computer processor may permit a large number of store instructions within a single instruction block to be committed en masse. In situations where multiple store instructions write to the same memory address, the store instructions must be presented to the memory system in order, so that other threads do not observe out-of-order writes to the memory address. Iterating through each store instruction in the instruction block to commit and drain the store instructions in order would reduce the ability of the block-based computer processor to commit and drain multiple instructions in parallel. Thus, it is desirable to provide a high-performance mechanism for committing and draining blocks of store instructions that write to the same memory address, while maintaining coherency and consistency, in an unordered store queue.

SUMMARY OF THE DISCLOSURE

Aspects disclosed in the detailed description include providing coherent merging of committed store queue entries in unordered store queues of block-based computer processors. In this regard, in one aspect, a block-based computer processor provides a merging logic circuit that is communicatively coupled to an unordered store queue and a cache memory. To drain the unordered store queue, the merging logic circuit first selects a committed store queue entry in the unordered store queue corresponding to a committed store instruction. In some aspects, selection of the committed store queue entry may be arbitrary, while some aspects may provide that a committed store queue entry corresponding to an oldest pending instruction block may be selected. A memory address, an age indicator, and a data value of the committed store queue entry are read, and the age indicator and the data value are stored in one or more merged data bytes within a merged data buffer. The merging logic circuit then locates any remaining committed store queue entries having a memory address identical to the first selected committed store queue entry. If a remaining committed store queue entry having an identical memory address is located, its age indicator and data value are read by the merging logic circuit, and are merged into the merged data buffer based on the age indicator and one or more age indicators of the one or more merged data bytes within the merged data buffer. In some aspects, merging data into the merged data buffer may also be based on byte masks indicating valid data within the data values read from the unordered store queue. Once all remaining committed store queue entries having a memory address identical to the first selected committed store queue entry have been read and merged, the one or more merged data bytes are output from the merged data buffer to the cache memory. In this manner, the committed store queue entries corresponding to a same memory address may be efficiently and coherently merged and provided to memory.

In another aspect, a block-based computer processor is provided. The block-based computer processor comprises a cache memory, and an unordered store queue comprising a plurality of store queue entries. The block-based computer processor also comprises a merging logic circuit that is communicatively coupled to the unordered store queue and the cache memory, and that comprises a merged data buffer for storing a plurality of merged data bytes. The merging logic circuit is configured to select a first committed store queue entry of the plurality of store queue entries of the unordered store queue. The merging logic circuit is further configured to read a memory address, a first age indicator, and a first data value from the first committed store queue entry. The merging logic circuit is also configured to store the first age indicator and the first data value in one or more merged data bytes of the plurality of merged data bytes of the merged data buffer. For each remaining committed store queue entry of the plurality of store queue entries of the unordered store queue having an identical memory address as the first committed store queue entry, the merging logic circuit is additionally configured to read a second age indicator and a second data value from the remaining committed store queue entry. The merging logic circuit is further configured to merge the second data value into the one or more merged data bytes of the plurality of merged data bytes of the merged data buffer, based on the second age indicator and one or more age indicators of the one or more merged data bytes. The merging logic circuit is also configured to output the plurality of merged data bytes of the merged data buffer to the cache memory.

In another aspect, a block-based computer processor is provided. The block-based computer processor comprises a means for selecting a first committed store queue entry of a plurality of store queue entries of an unordered store queue.

The block-based computer processor further comprises a means for reading a memory address, a first age indicator, and a first data value from the first committed store queue entry. The block-based computer processor also comprises a means for storing the first age indicator and the first data value in one or more merged data bytes of a plurality of merged data bytes of a merged data buffer. For each remaining committed store queue entry of the plurality of store queue entries of the unordered store queue having an identical memory address as the first committed store queue entry, the block-based computer processor additionally comprises a means for reading a second age indicator and a second data value from the remaining committed store queue entry. The block-based computer processor further comprises a means for merging the second data value into the one or more merged data bytes of the plurality of merged data bytes of the merged data buffer, based on the second age indicator and one or more age indicators of the one or more merged data bytes. The block-based computer processor also comprises a means for outputting the plurality of merged data bytes of the merged data buffer to a cache memory.

In another aspect, a method for coherently merging committed store queue entries in an unordered store queue of a block-based computer processor is provided. The method comprises selecting a first committed store queue entry of a plurality of store queue entries of the unordered store queue. The method further comprises reading a memory address, a first age indicator, and a first data value from the first committed store queue entry. The method also comprises storing the first age indicator and the first data value in one or more merged data bytes of a plurality of merged data bytes of a merged data buffer. For each remaining committed store queue entry of the plurality of store queue entries of the unordered store queue having an identical memory address as the first committed store queue entry, the method additionally comprises reading a second age indicator and a second data value from the remaining committed store queue entry. The method further comprises merging the second data value into the one or more merged data bytes of the plurality of merged data bytes of the merged data buffer, based on the second age indicator and one or more age indicators of the one or more merged data bytes. The method also comprises outputting the plurality of merged data bytes of the merged data buffer to a cache memory.

DETAILED DESCRIPTION

Figure 1:
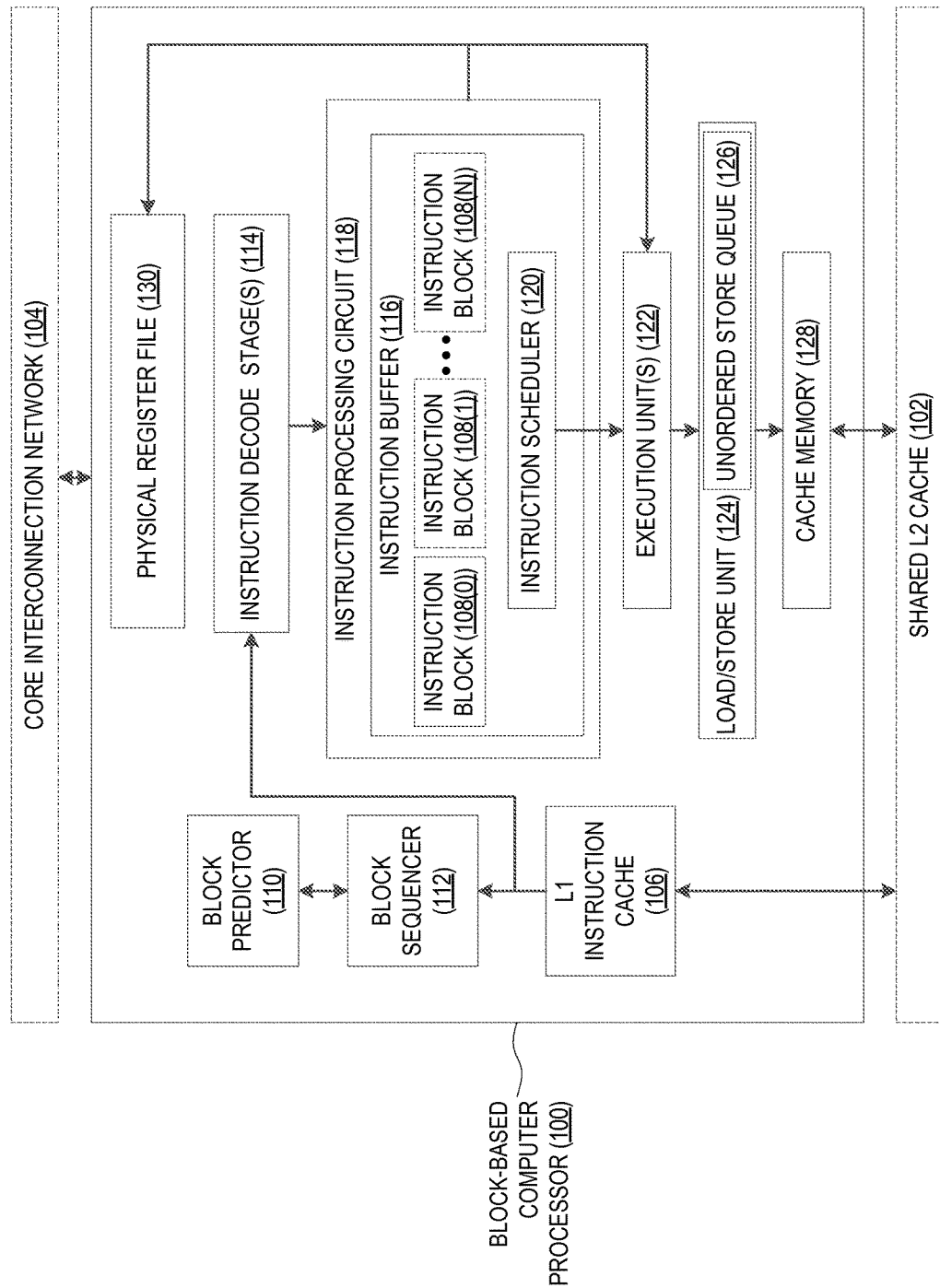
FIG. 1 is a block diagram of an exemplary block-based computer processor implementing a block-based instruction set architecture (ISA), and including an unordered store queue for storing committed store instructions.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include providing coherent merging of committed store queue entries in unordered store queues of block-based computer processors. In this regard, in one aspect, a block-based computer processor provides a merging logic circuit that is communicatively coupled to an unordered store queue and a cache memory. To drain the unordered store queue, the merging logic circuit first selects a committed store queue entry in the unordered store queue corresponding to a committed store instruction. In some aspects, selection of the committed store queue entry may be arbitrary, while some aspects may provide that a committed store queue entry corresponding to an oldest pending instruction block may be selected. A memory address, an age indicator, and a data value of the committed store queue entry are read, and the age indicator and the data value are stored in one or more merged data bytes within a merged data buffer. The merging logic circuit then locates any remaining committed store queue entries having a memory address identical to the first selected committed store queue entry. If a remaining committed store queue entry having an identical memory address is located, its age indicator and data value are read by the merging logic circuit, and are merged into the merged data buffer based on the age indicator and one or more age indicators of the one or more merged data bytes within the merged data buffer. In some aspects, merging data into the merged data buffer may also be based on byte masks indicating valid data within the data values read from the unordered store queue. Once all remaining committed store queue entries having a memory address identical to the first selected committed store queue entry have been read and merged, the one or more merged data bytes are output from the merged data buffer to the cache memory. In this manner, the committed store queue entries corresponding to a same memory address may be efficiently and coherently merged and provided to memory.

Before discussing a merging logic circuit for providing coherent merging of committed store queue entries in an unordered store queue of a block-based computer processor, exemplary elements and operation of an exemplary block-based computer processor are described. In this regard, FIG. 1 illustrates an exemplary block-based computer processor 100 that is based on a block-based instruction set architecture (ISA), and that is configured to execute a sequence of instruction blocks. In some aspects, the block-based computer processor 100 may comprise one of multiple block-based computer processor cores (not shown), each executing separate sequences of instruction blocks and/or coordinating to execute a single sequence of instruction blocks. The block-based computer processor 100 may access a shared Level 2 (L2) cache 102 for receiving instruction blocks for execution and/or for storing data resulting from instruction block execution. In aspects in which the block-based computer processor 100 comprises one of multiple block-based computer processor cores, a core interconnection network 104 may be employed for inter-core communications. The block-based computer processor 100 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

In exemplary operation, a Level 1 (L1) instruction cache 106 of the block-based computer processor 100 may receive instruction blocks (e.g., instruction blocks 108(0)-108(N) for execution from the shared L2 cache 102. It is to be understood that, at any given time, the block-based computer processor 100 may be processing more or fewer instruction blocks than the instruction blocks 108(0)-108(N) illustrated in FIG. 1. A block predictor 110 determines a predicted execution path of the instruction blocks 108(0)-108(N). In some aspects, the block predictor 110 may predict an execution path in a manner analogous to a branch predictor of a conventional out-of-order (OOO) processor. A block sequencer 112 orders the instruction blocks 108(0)-108(N), and forwards the instruction blocks 108(0)-108(N) to one of one or more instruction decode stage(s) 114 for decoding.

After decoding, the instruction blocks 108(0)-108(N) are held in an instruction buffer 116 of an instruction processing circuit 118 pending execution. An instruction scheduler 120 distributes instructions (not shown) of the active instruction blocks 108(0)-108(N) to one of one or more execution units 122 of the block-based computer processor 100. As non-limiting examples, the one or more execution units 122 may comprise an arithmetic logic unit (ALU) and/or a floating-point unit. The one or more execution units 122 may provide results of instruction execution to a load/store unit 124. In the example of FIG. 1, the load/store unit 124 provides an unordered store queue 126, in which store instructions (not shown) and their associated data may be held for processing. In some aspects, the unordered store queue 126 may comprise a load/store queue (LSQ), in which both load instructions and store instructions are stored. As each store instruction in the unordered store queue 126 is processed, the execution results may be stored in a cache memory 128. According to some aspects, the cache memory 128 may comprise an L1 data cache (not shown).

The one or more execution units 122 may additionally or alternatively store execution results in a physical register file 130. The physical register file 130, in some aspects, comprises multiple physical registers (not shown) that provide named physical storage locations for data values. Some aspects may provide that the physical register file 130 may be implemented by fast static Random Access Memory (RAM) having dedicated read and write ports, as a non-limiting example.

As noted above, the load/store unit 124 of the block-based computer processor 100 of FIG. 1 employs the unordered store queue 126 to hold store instructions. The use of the unordered store queue 126 allows entries for store instructions to be allocated out-of-order (e.g., at execution of each store instruction rather than at decoding) into any available store queue entry (not shown) within the unordered store queue 126. This may enable the unordered store queue 126 to reduce the time that a store queue entry remains in the unordered store queue 126, and enable the unordered store queue 126 to be banked based on address. However, "draining" the unordered store queue 126 (i.e., outputting the contents of the committed store queue entries to the cache memory 128 and de-allocating the committed store queue entries) may pose challenges for the block-based computer processor 100. In a conventional processor, multiple committed store queue entries having a same memory address (not shown) are presented to the cache memory 128 in order, so that other executing threads (not shown) do not observe out-of-order writes to the memory address. However, because the block-based computer processor 100 may permit a large number of store instructions within a single instruction block 108(0)-108(N) to be committed en masse, it is desirable to provide a high-performance mechanism for committing and draining committed store queue entries having the same memory address, while maintaining memory coherency and consistency.

Figure 2:
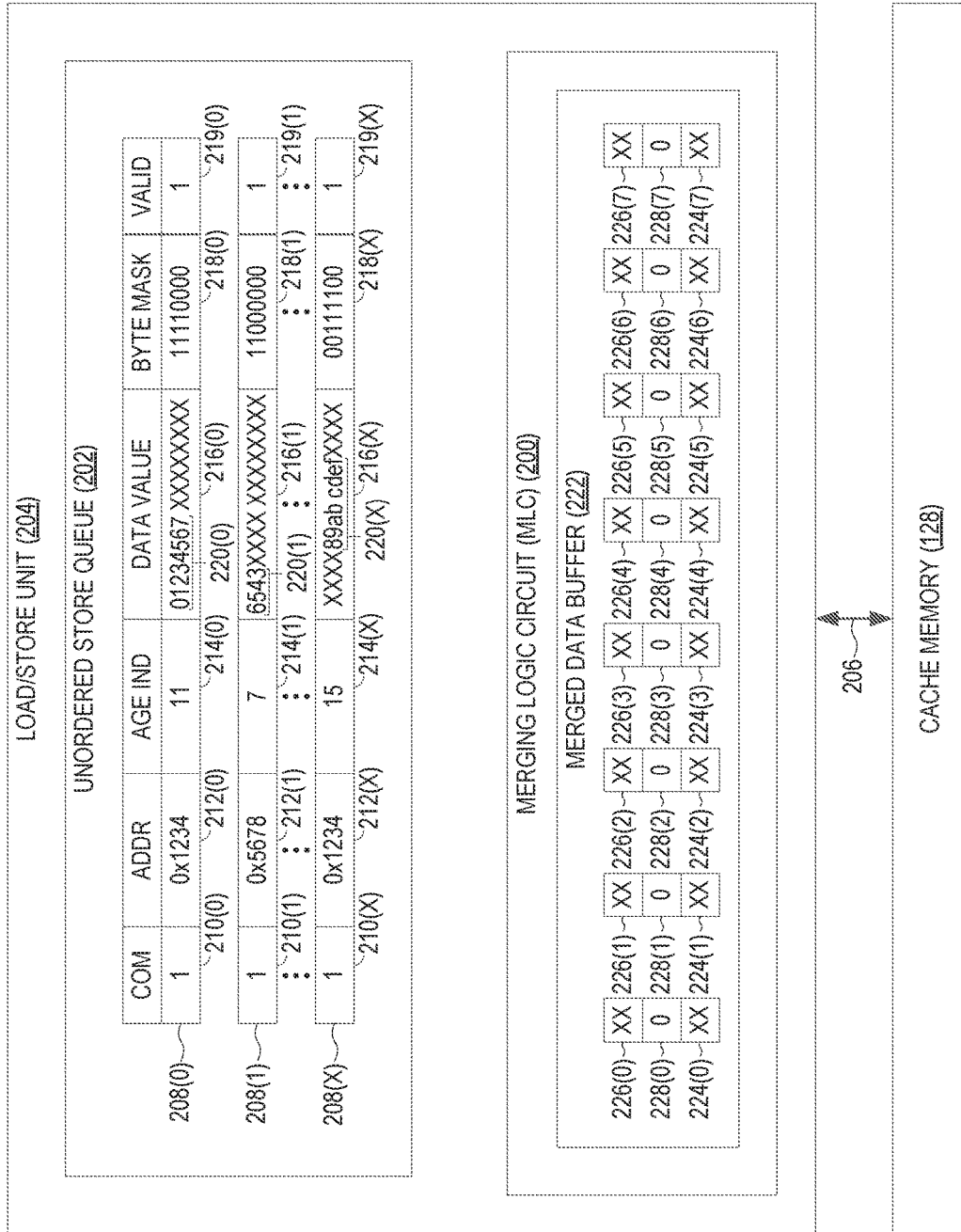
FIG. 2 is a block diagram illustrating exemplary elements of a merging logic circuit for coherently merging committed store queue entries in the unordered store queue of FIG. 1 into a cache memory.

In this regard, FIG. 2 illustrates a merging logic circuit 200 that provides coherent merging of committed store queue entries in an unordered store queue 202. In the example of FIG. 2, a load/store unit 204 having functionality corresponding to the load/store unit 124 of FIG. 1 is shown. The load/store unit 204 is communicatively coupled to the cache memory 128 of FIG. 1, as indicated by bidirectional arrow 206. The load/store unit 204 includes the merging logic circuit 200, and further includes the unordered store queue 202, which in some aspects may correspond to the unordered store queue 126 of FIG. 1.

The unordered store queue 202 provides a plurality of store queue entries 208(0)-208(X). For purposes of illustration, three (3) store queue entries 208(0), 208(1), and 208(X) are shown in the example of FIG. 2. However, it is to be understood that in some aspects the unordered store queue 202 may include more store queue entries 208(0)-208(X) than illustrated herein.

Each of the store queue entries 208(0)-208(X) of FIG. 2 corresponds to a store instruction (not shown) that has been executed by the block-based computer processor 100 of FIG. 1. Accordingly, each of the store queue entries 208(0)-208(X) includes multiple data fields for storing data associated with the executed store instructions. These data fields include committed indicators ("COM") 210(0)-210(X), memory addresses ("ADDR") 212(0)-212(X), age indicators ("AGE IND") 214(0)-214(X), data values 216(0)-216(X), byte masks 218(0)-218(X), and valid indicators 219(0)-219(X), each of which is described in greater detail below.

The committed indicators 210(0)-210(X) indicate whether the corresponding store queue entries 208(0)-208(X) represent committed entries within the unordered store queue 202. In some aspects, each of the committed indicators 210(0)-210(X) comprises a one-bit flag. In such aspects, the committed indicators 210(0)-210(X) may be set to a value of one (1) to indicate that the corresponding store queue entry 208(0)-208(X) is committed (e.g., when an instruction block containing instructions associated with the store queue entries 208(0)-208(X)), or may be set to a value of zero (0) to indicate that the corresponding store queue entry 208(0)-208(X) is not yet committed.

The memory addresses 212(0)-212(X) of the store queue entries 208(0)-208(X) each indicate a memory location to which a store instruction associated with the corresponding store queue entry 208(0)-208(X) is attempting to write. There may be more than one store queue entry 208(0)-208(X) in the unordered store queue 202 having identical memory addresses 212(0)-212(X). For instance, in the example of FIG. 2, the store queue entries 208(0) and 208(X) have memory addresses 212(0) and 212(X) of 0x1234, indicating that the store instructions associated with both of the store queue entries 208(0) and 208(X) are writing to the same memory address 0x1234.

The store queue entries 208(0)-208(X) further include respective age indicators 214(0)-214(X), which provide a mechanism for the merging logic circuit 200 to determine a relative age of each of the store queue entries 208(0)-208(X). In FIG. 2, it is assumed that lower values of the age indicators 214(0)-214(X) correspond to older store queue entries 208(0)-208(X). Thus, the store queue entry 208(1) having an age indicator 214(1) with a value of seven (7) is the oldest of the store queue entries 208(0)-208(X), while the store queue entry 208(X) having an age indicator 214(X) with a value of fifteen (15) is the youngest. In some aspects, the age indicators 214(0)-214(X) may each comprise an indication of a phase in which the store instruction associated with the corresponding store queue entry 208(0)-208(X) is executing, a core on which the store instruction associated with the corresponding store queue entry 208(0)-208(X) is executing, and/or an instruction block within which the store instruction associated with the corresponding store queue entry 208(0)-208(X) is executing.

The data values 216(0)-216(X) of the store queue entries 208(0) represent the actual data to be written to the cache memory 128 by the store instructions associated with the store queue entries 208(0)-208(X). In some aspects, the data values 216(0)-216(X) may comprise a double word of sixty-four (64) bits. However, it is to be understood that the store instructions associated with the store queue entries 208(0)-208(X) may comprise instructions that operate on a smaller portion of the data values 216(0)-216(X), such as byte store instructions and/or word store instructions having addresses that are aligned to a 64-bit boundary, as a non-limiting example. As a result, the data values 216(0)-216(X) may include sets 220(0)-220(X) of valid data bytes to be written. These sets 220(0)-220(X) of valid data bytes within the data values 216(0)-216(X) are indicated by the byte masks 218(0)-218(X) corresponding to the data values 216(0)-216(X). For example, the byte mask 218(0) indicates that the first four (4) bytes of the data value 216(0) (corresponding to the set 220(0)) contains valid data. As a further non-limiting example, the memory addresses 212(0)-212(X) corresponding to store queue entries 208(0)-208(X) may be aligned to a 64-bit boundary, with the byte masks 218(0)-218(X) indicating which bytes within the 64-bit aligned words are written by the corresponding store instructions.

The valid indicators 219(0)-219(X) indicate whether the corresponding store queue entries 208(0)-208(X) contain valid data. In some aspects, each of the valid indicators 219(0)-219(X) comprises a one-bit flag. In such aspects, the valid indicators 219(0)-219(X) may be set to a value of one (1) to indicate that the corresponding store queue entry 208(0)-208(X) is valid, or may be set to a value of zero (0) to indicate that the corresponding store queue entry 208(0)-208(X) is invalid. The load/store unit 204 may then reallocate the store queue entries 208(0)-208(X) having valid indicators 219(0)-219(X) set to zero (0) to store data for newly committed store instructions (not shown).

To provide coherent merging of the store queue entries 208(0)-208(X) in the unordered store queue 202, the merging logic circuit 200 includes a merged data buffer 222. The merged data buffer 222 includes a plurality of merged data bytes 224(0)-224(7), which are associated with age indicators 226(0)-226(7) and valid indicators 228(0)-228(7). The merged data bytes 224(0)-224(7) may store data that has been merged from two (2) or more store queue entries 208(0)-208(X) having identical memory addresses 212(0)-212(X). Each of the age indicators 226(0)-226(7) stores the value of the age indicators 214(0)-214(X) of the youngest store queue entry 208(0)-208(X) whose data is stored in the corresponding merged data byte 224(0)-224(7). The valid indicators 228(0)-228(7) indicate whether the corresponding merged data byte 224(0)-224(7) stores valid data. Some aspects may provide that each of the valid indicators 228(0)-228(7) comprises a one-bit flag that may be set to a value of one (1) to indicate that the corresponding merged data byte 224(0)-224(7) stores valid data, or may be set to a value of zero (0) to indicate that the corresponding merged data byte 224(0)-224(7) is unused or stores invalid data. It is to be understood that while the merged data buffer 222 in FIG. 2 provides eight (8) merged data bytes 224(0)-224(7), some aspects may provide more or fewer merged data bytes 224(0)-224(7) than illustrated herein.

Figure 3A:
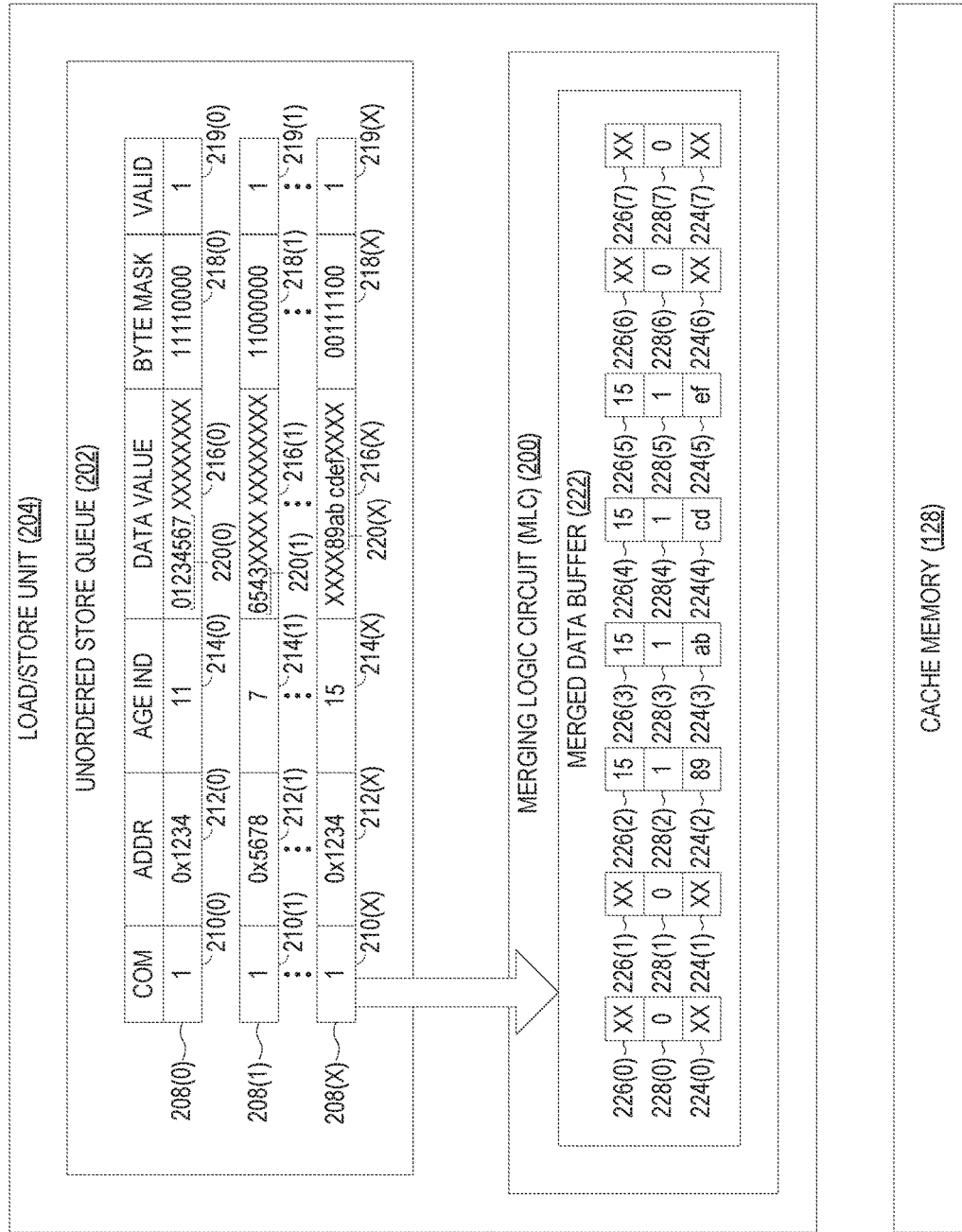
FIGS. 3A-3C are block diagrams illustrating exemplary operations by the merging logic circuit and exemplary communications flows among the unordered store queue, the merging logic circuit, and a cache memory of FIG. 2 for selecting, merging, and outputting committed store queue entries.
Figure 3B:
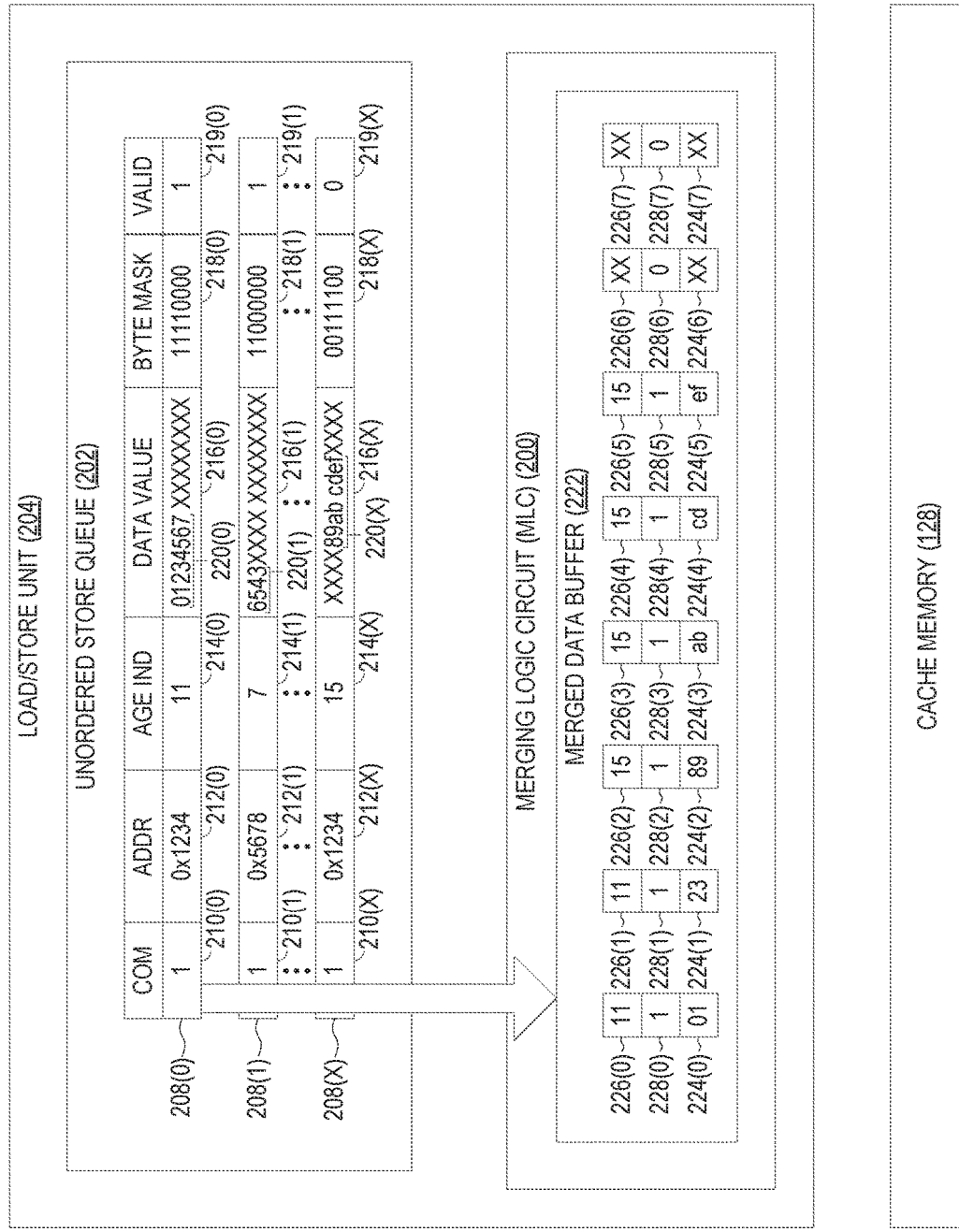
Figure 3C:
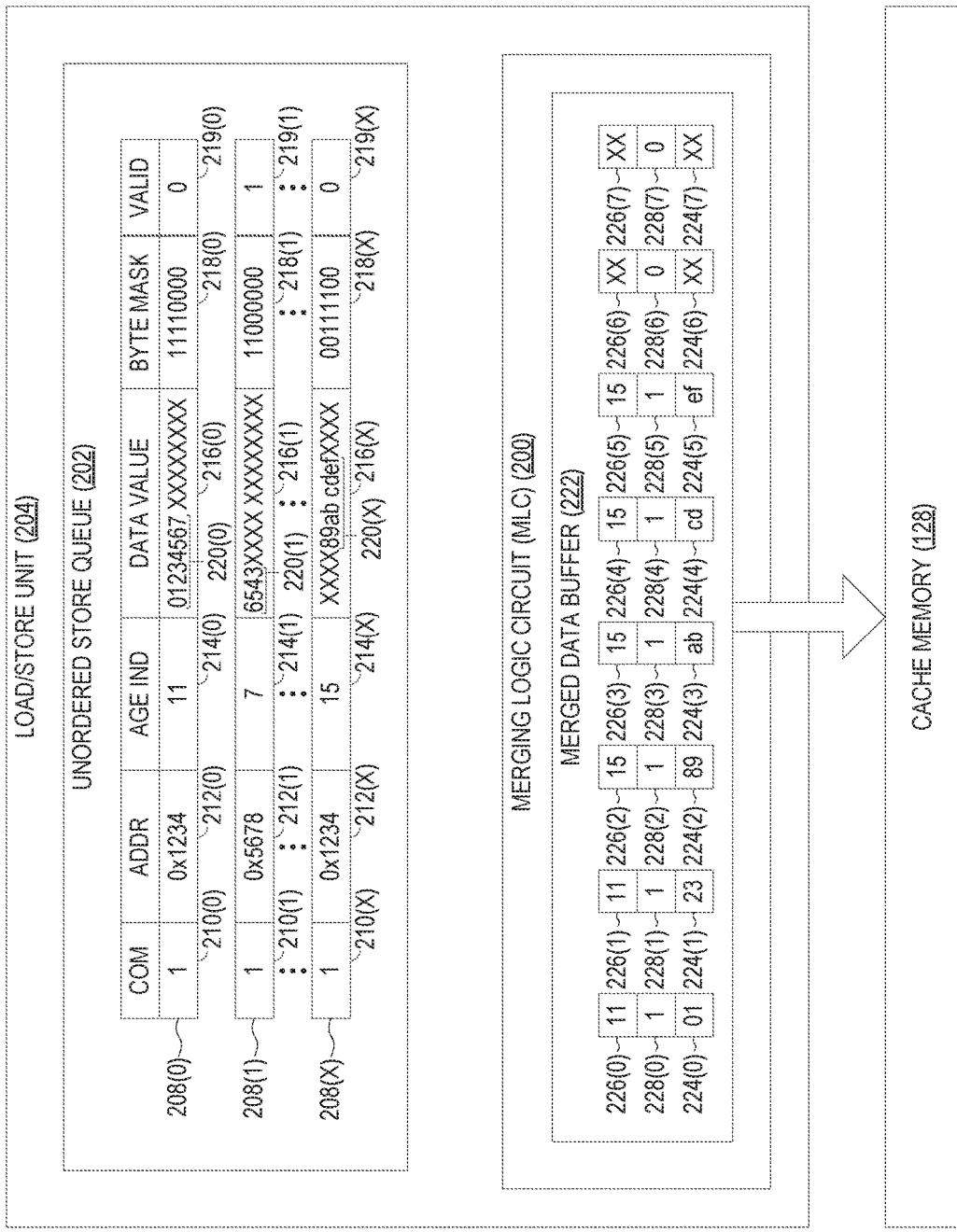

To illustrate exemplary operations by the merging logic circuit 200 and exemplary communications flows among the unordered store queue 202, the merging logic circuit 200, and the cache memory 128 of FIG. 2 for selecting, merging, and outputting store queue entries 208(0)-208(X), FIGS. 3A-3C are provided. For the sake of clarity, elements of FIG. 2 are referenced in describing FIGS. 3A-3C. In FIG. 3A, the merging logic circuit 200 first selects one of the store queue entries 208(0)-208(X) for processing. The selected store queue entry 208(0)-208(X) may be referred to herein as a "first store queue entry 208(0)-208(X)." In some aspects, the selection of one of the store queue entries 208(0)-208(X) may be arbitrary or pseudo-random. Some aspects may provide that the merging logic circuit 200 may select one of the store queue entries 208(0)-208(X) corresponding to an oldest pending instruction block (not shown). This may facilitate reuse and reallocation of the store queue entries 208(0)-208(X) by ensuring that the store queue entries 208(0)-208(X) associated with older instruction blocks are processed first.

In the example of FIG. 3A, the merging logic circuit 200 has selected the store queue entry 208(X), with a memory address 212(X) of 0x1234, for processing. Accordingly, the merging logic circuit 200 reads the memory address 212(X), the age indicator 214(X), and the data value 216(X) of the store queue entry 208(X) from the unordered store queue 202. In some aspects, the merging logic circuit 200 also reads the byte mask 218(X), which, as noted above, indicates the set 220(X) of valid data bytes within the data value 216(X). The merging logic circuit 200 then stores the age indicator 214(X) and the data value 216(X) of the store queue entry 208(X) in the age indicators 226(2)-226(5) and the merged data bytes 224(2)-224(5), respectively, of the merged data buffer 222. Note that the merged data bytes 224(2)-224(5) occupy locations within the merged data buffer 222 corresponding to the location of the set 220(X) of valid data bytes within the data value 216(X), as indicated by the byte mask 218(X). The merging logic circuit 200 also sets the valid indicators 228(2)-228(5) of the merged data bytes 224(2)-224(5) corresponding to the set 220(X) of valid data bytes within the data value 216(X) to indicate a valid state. Here, the valid indicators 228(2)-228(5) are set to a value of one (1), indicating that the merged data bytes 224(2)-224(5) currently hold valid data. According to some aspects, after reading the memory address 212(X), the age indicator 214(X), and the data value 216(X) of the store queue entry 208(X), the merging logic circuit 200 may invalidate the store queue entry 208(X) (e.g., by setting the valid indicator 219(X) to a value of zero (0)).

Referring now to FIG. 3B, the merging logic circuit 200 next determines whether any other store queue entries 208(0)-208(X) having a memory address 212(0)-212(X) that is identical to the memory address 212(X) of the store queue entry 208(X) remain within the unordered store queue 202. As seen in FIG. 3B, the store queue entry 208(0) also has a memory address 212(0) of 0x1234, which matches the memory address 212(X) of the store queue entry 208(X). Accordingly, the merging logic circuit 200 reads the age indicator 214(0) and the data value 216(0) of the store queue entry 208(0). Some aspects may provide that the merging logic circuit 200 also reads the byte mask 218(0) indicating the set 220(0) of valid data bytes within the data value 216(0) of the store queue entry 208(0). In some aspects, after reading the age indicator 214(0) and the data value 216(0) of the store queue entry 208(0), the merging logic circuit 200 may invalidate the store queue entry 208(0) (e.g., by setting the valid indicator 219(0) to a value of zero (0)).

The merging logic circuit 200 next merges the data value 216(0) into one or more of the merged data bytes 224(0)-224(7) of the plurality of merged data bytes 224(0)-224(7) of the merged data buffer 222, based on the age indicator 214(0) and the age indicators 226(0)-226(7) of the merged data bytes 224(0)-224(7). To perform the merging, the merging logic circuit 200 may perform a byte-by-byte evaluation of the bytes of the data value 216(0) and the corresponding merged data bytes 224(0)-224(7). In some aspects, the merging logic circuit 200 may first determine whether a byte of the data value 216(0) contains valid data (based on the byte mask 218(0), as a non-limiting example). If a byte of the data value 216(0) does not contain valid data (such as the last four (4) bytes of the data value 216(0)), then no change is made to the contents of the corresponding merged data bytes 224(0)-224(7).

However, if a byte of the data value 216(0) does contain valid data (such as the first four (4) bytes of the data value 216(0)), the merging logic circuit 200 in some aspects may determine whether the corresponding merged data bytes 224(0)-224(7) contain valid data, based on the valid indicators 228(0)-228(7). For merged data bytes 224(0)-224(7) that do not contain valid data, the merging logic circuit 200 may store the corresponding bytes of the set 220(0) of valid data bytes within the data value 216(0) in the merged data bytes 224(0)-224(7). For example, the merging logic circuit 200 may determine that the merged data bytes 224(0) and 224(1), corresponding to the first two (2) bytes of the set 220(0) of valid data bytes within the data value 216(0), do not contain valid data. Accordingly, the merging logic circuit 200 stores the values "01" and "23" from the first two (2) data bytes of the set 220(0) in the merged data bytes 224(0) and 224(1), respectively. The merging logic circuit 200 also stores the age indicator 214(0) in the age indicators 226(0) and 226(1) of the merged data bytes 224(0) and 224(1), respectively, and sets the valid indicators 228(0) and 228(1) to a value of one (1).

For merged data bytes 224(0)-224(7) that already contain valid data, the merging logic circuit 200 compares the age indicator 214(0) of the store queue entry 208(0) with the age indicators 226(0)-226(7) of the merged data bytes 224(0)-224(7). If the age indicator 214(0) and the age indicators 226(0)-226(7) indicate that the merged data bytes 224(0)-224(7) are older than the data value 216(0), the merging logic circuit 200 stores the corresponding bytes of the data value 216(0) in the merged data bytes 224(0)-224(7), and also stores the age indicator 214(0) in the corresponding age indicators 226(0)-226(7) Otherwise, the merging logic circuit 200 retains the data stored in the merged data bytes 224(0)-224(7). In the example of FIG. 3B, the merging logic circuit 200 determines that the merged data bytes 224(2) and 224(3) already contain valid data. Thus, the merging logic circuit 200 compares the age indicator 214(0) and the age indicators 226(2) and 226(3) of the merged data bytes 224(2) and 224(3). The age indicator 214(0), having a value of eleven (11), indicates that the store queue entry 208(0) is older than the merged data bytes 224(2) and 224(3), which have corresponding age indicators 226(2) and 226(3) with a value of fifteen (15). As a result, the merging logic circuit 200 retains the values already stored in the merged data bytes 224(2) and 224(3) rather than storing the values of the last two (2) data bytes of the set 220(0) in the merged data bytes 224(2) and 224(3).

Processing of the store queue entries 208(0)-208(X) by the merging logic circuit 200 continues in this manner until there are no remaining store queue entries 208(0)-208(X) having a memory address 212(0)-212(X) that is identical to the memory address 212(X) of the store queue entry 208(X). As seen in FIG. 3C, both of the store queue entries 208(0), 208(X) having memory addresses 212(0), 212(X) of 0x1234 have been merged into the merged data buffer 222 of the merging logic circuit 200. Accordingly, the merging logic circuit 200 outputs the merged data bytes 224(0)-224(7) to the cache memory 128. In some aspects, additional performance improvement may be realized by selecting a next store queue entry 208(0)-208(X) for processing in parallel with outputting the merged data bytes 224(0)-224(7) to the cache memory 128.

Figure 4:
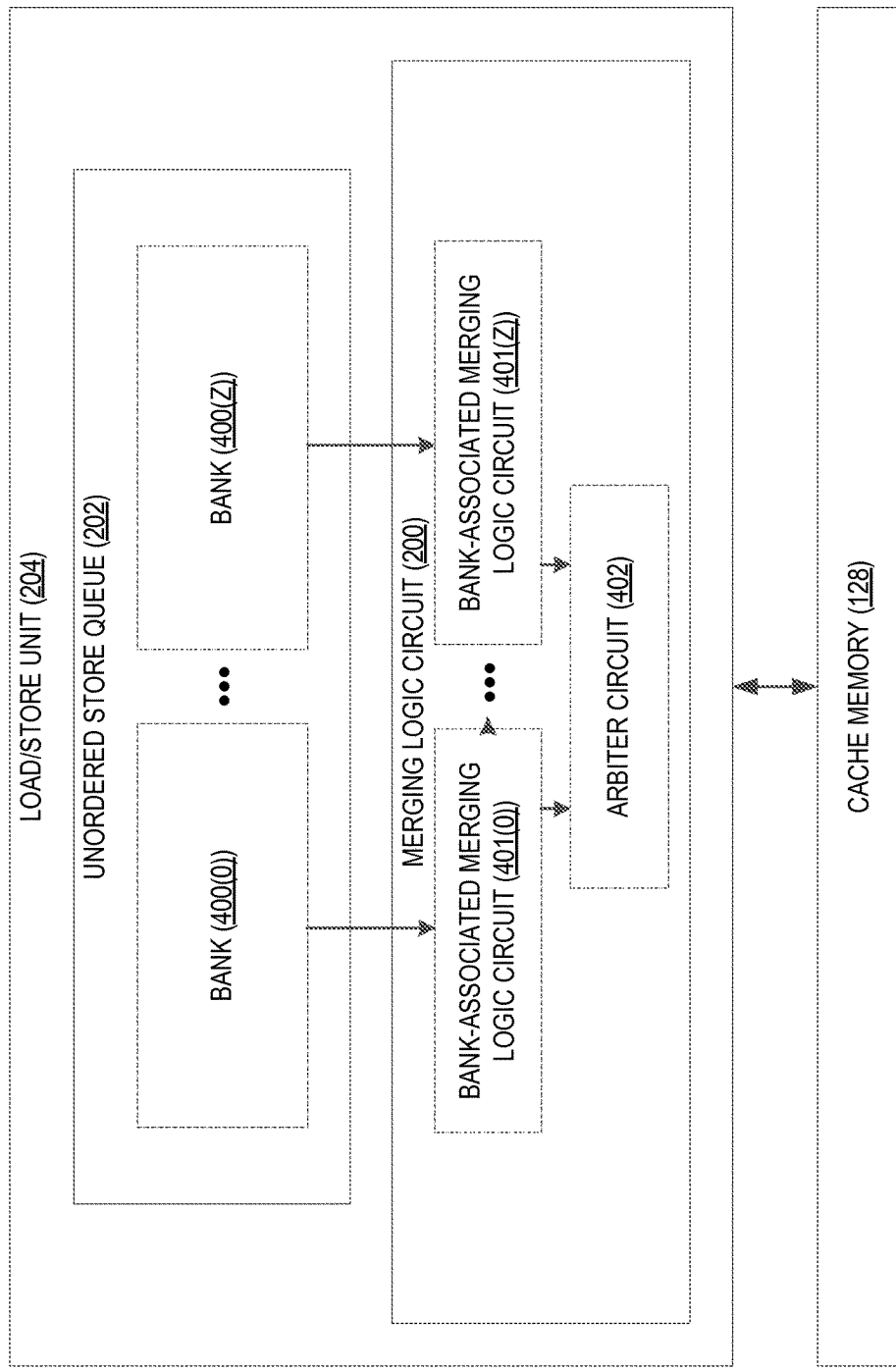
FIG. 4 is a block diagram illustrating an exemplary aspect of a merging logic circuit including multiple store queue banks and an arbiter circuit for selecting a store queue bank to drain.

In some aspects, the unordered store queue 202 may be a "banked" store queue, in which subsets of the store queue entries 208(0)-208(X) are housed in separate banks. Such a banked store queue may be useful for providing unaligned memory accesses, as a non-limiting example. In this regard, FIG. 4 illustrates an exemplary aspect of the load/store unit 204 that includes an unordered store queue 202 providing a plurality of banks 400(0)-400(Z). The merging logic circuit 200 in the example of FIG. 4 provides a plurality of bank-associated merging logic circuits 401(0)-401(Z), each of which is associated with a corresponding bank 400(0)-400(Z). The bank-associated merging logic circuits 401(0)-401(Z) may be configured to select and merge store queue entries from the respective banks 400(0)-400(Z) concurrently. To select a bank-associated merging logic circuit 401(0)-401(Z) to drain to the cache memory 128 (i.e., to output merged data bytes) at a given time, an arbiter circuit 402 may be provided. The arbiter circuit 402 may select a bank-associated merging logic circuit 401(0)-401(Z) based on considerations such as bank usage, ready status, and/or processor performance, as non-limiting examples.

Figure 5A:
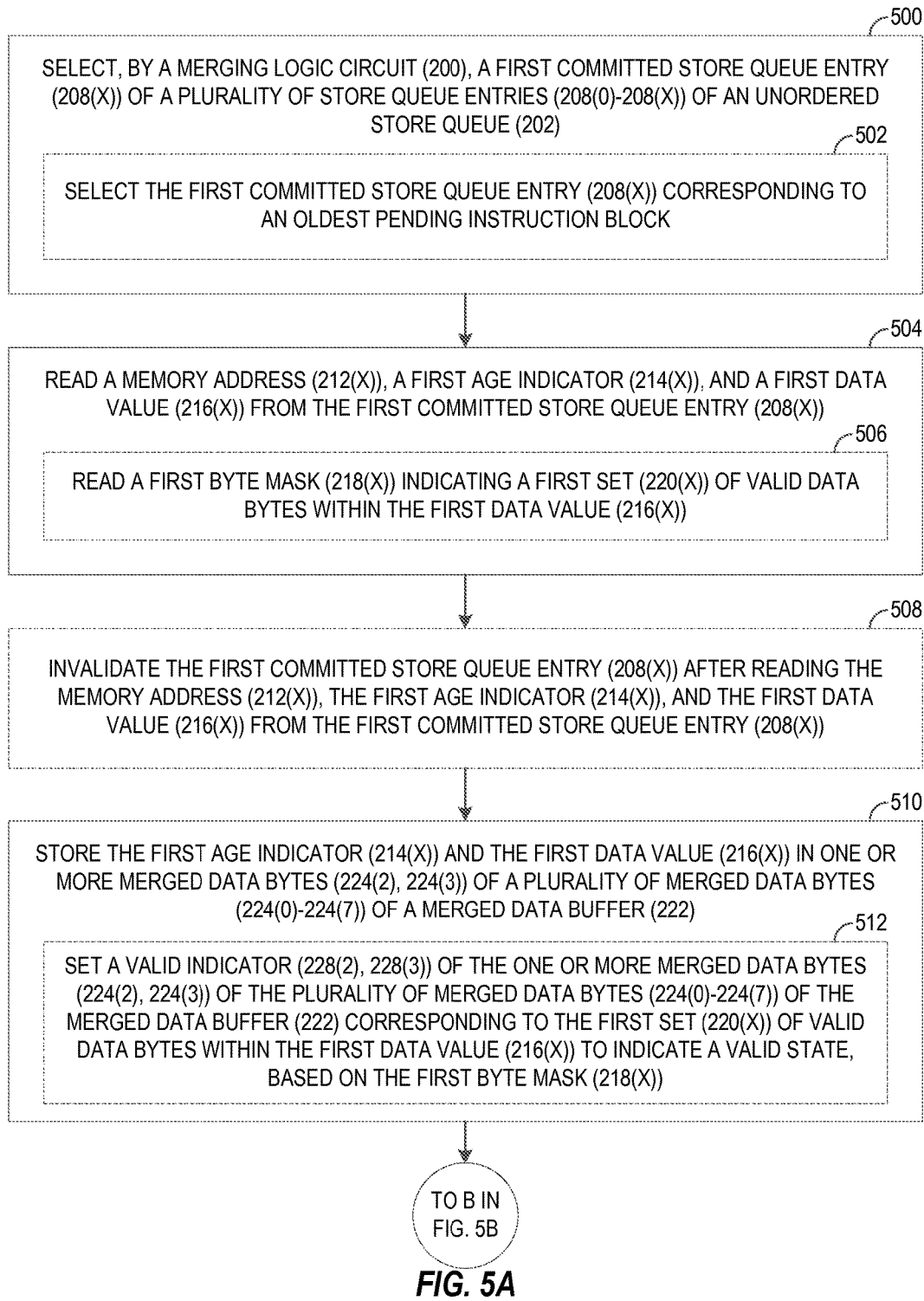
FIGS. 5A-5D are flowcharts illustrating an exemplary process for providing coherent merging of committed store queue entries by the merging logic circuit of FIG. 2.

FIGS. 5A-5D are flowcharts that illustrate an exemplary process for providing coherent merging of store queue entries 208(0)-208(X) by the merging logic circuit 200 of FIG. 2. Elements of FIG. 2 are referenced in describing FIGS. 5A-5D for the sake of clarity. In FIG. 5A, operations begin with the merging logic circuit 200 selecting a first store queue entry 208(X) of a plurality of store queue entries 208(0)-208(X) of the unordered store queue 202 (block 500). In this regard, the merging logic circuit 200 may be referred to herein as "a means for selecting a first committed store queue entry of a plurality of store queue entries of an unordered store queue." In some aspects, operations of block 500 for selecting the first committed store queue entry 208(X) may comprise selecting the first store queue entry 208(X) corresponding to an oldest pending instruction block (block 502). Accordingly, the merging logic circuit 200 may be referred to herein as "a means for selecting the first store queue entry corresponding to an oldest pending instruction block."

The merging logic circuit 200 next reads a memory address 212(X), a first age indicator 214(X), and a first data value 216(X) from the first store queue entry 208(X) (block 504). The merging logic circuit 200 may thus be referred to herein as "a means for reading a memory address, a first age indicator, and a first data value from the first committed store queue entry." According to some aspects, the operations of block 504 for reading the first data value 216(X) may further comprise reading a first byte mask 218(X) indicating a first set 220(X) of valid data bytes within the first data value 216(X) (block 506). In this regard, the merging logic circuit 200 may be referred to herein as "a means for reading a first byte mask indicating a first set of one or more valid bytes within the first data value." Some aspects may provide that the merging logic circuit 200 invalidates the first store queue entry 208(X) after reading the memory address 212(X), the first age indicator 214(X), and the first data value 216(X) from the first store queue entry 208(X) (block 508). Accordingly, the merging logic circuit 200 may be referred to herein as "a means for invalidating the first store queue entry after reading the memory address, the first age indicator, and the first data value from the first store queue entry."

The merging logic circuit 200 then stores the first age indicator 214(X) and the first data value 216(X) in one or more merged data bytes 224(2), 224(3) of the plurality of merged data bytes 224(0)-224(7) of the merged data buffer 222 (block 510). The merging logic circuit 200 may thus be referred to herein as "a means for storing the first age indicator and the first data value in one or more merged data bytes of a plurality of merged data bytes of a merged data buffer." In some aspects, operations of block 510 for storing the first age indicator 214(X) and the first data value 216(X) in the one or more merged data bytes 224(2), 224(3) may include setting a valid indicator 228(2), 228(3) of the one or more merged data bytes 224(2), 224(3) of the plurality of merged data bytes 224(0)-224(7) of the merged data buffer 222 corresponding to the first set 220(X) of valid data bytes within the first data value 216(X) to indicate a valid state, based on the first byte mask 218(X) (block 512). In this regard, the merging logic circuit 200 may be referred to herein as "a means for setting a valid indicator of the one or more merged data bytes of the plurality of merged data bytes of the merged data buffer corresponding to the first set of one or more valid bytes within the first data value to indicate a valid state, based on the first byte mask." Processing then resumes at block 514 of FIG. 5B.

Figure 5B:
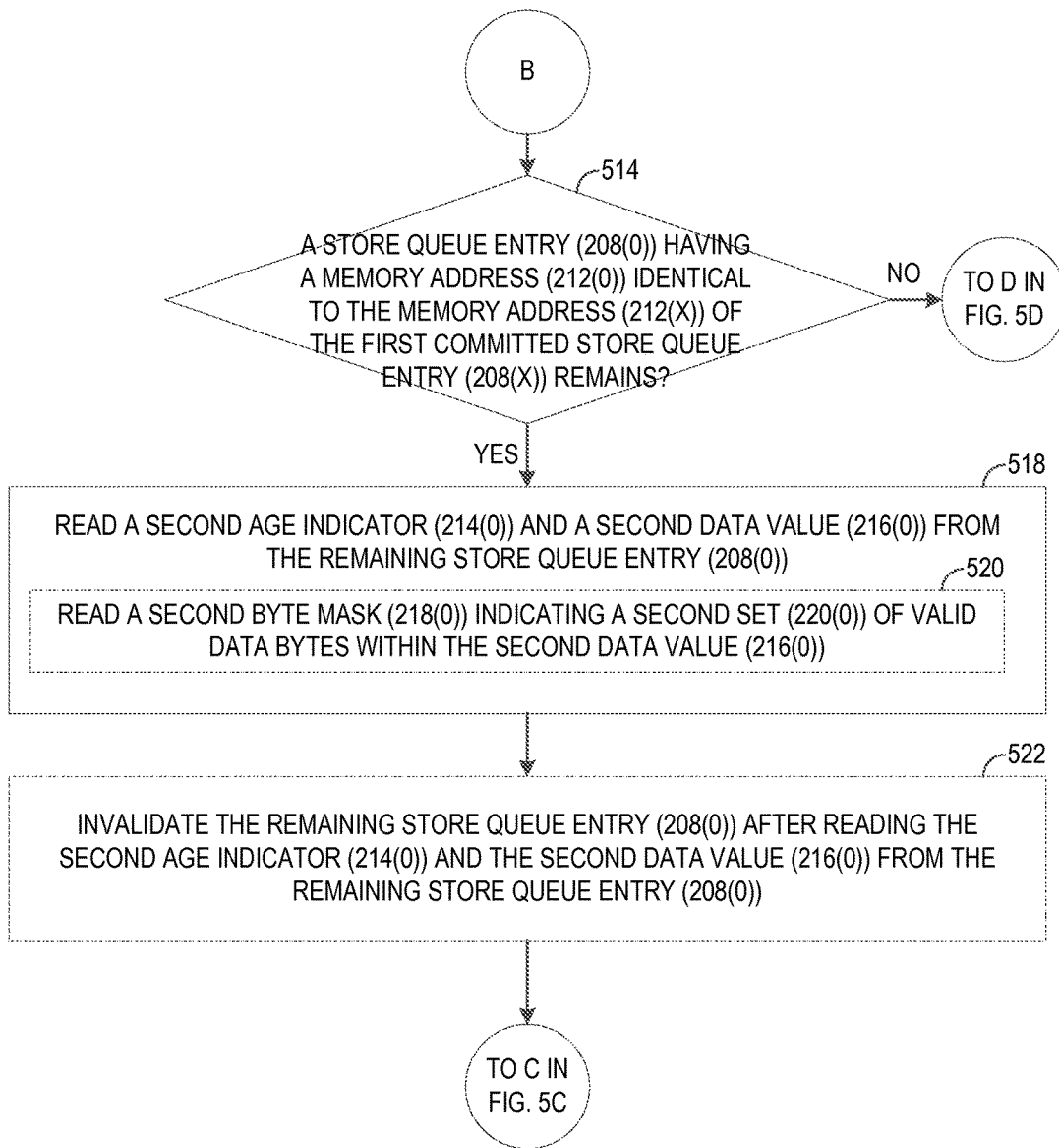

Referring now to FIG. 5B, the merging logic circuit 200 determines whether a store queue entry 208(0) having a memory address 212(0) identical to the memory address 212(X) of the first store queue entry 208(X) remains in the unordered store queue 202 (block 514). If no remaining store queue entry 208(0) having a memory address 212(0) identical to the memory address 212(X) of the first store queue entry 208(X) exists in the unordered store queue 202, processing resumes at block 516 of FIG. 5D. However, if the merging logic circuit 200 locates a remaining store queue entry 208(0), the merging logic circuit 200 reads a second age indicator 214(0) and a second data value 216(0) from the remaining store queue entry 208(0) (block 518). The merging logic circuit 200 may thus be referred to herein as "a means for reading a second age indicator and a second data value from the remaining store queue entry." In some aspects, operations of block 518 for reading the second data value 216(0) from the remaining store queue entry 208(0) may further comprise reading a second byte mask 218(0) indicating a second set 220(0) of valid data bytes within the second data value 216(0) (block 520). In this regard, the merging logic circuit 200 may be referred to herein as "a means for reading a second byte mask indicating a second set of one or more valid bytes within the second data value." Some aspects may provide that the merging logic circuit 200 invalidates the remaining store queue entry 208(0) after reading the second age indicator 214(0) and the second data value 216(0) from the remaining store queue entry 208(0) (block 522). Accordingly, the merging logic circuit 200 may be referred to herein as "a means for invalidating each remaining store queue entry after reading the second age indicator and the second data value from the remaining store queue entry." Processing then resumes at block 524 of FIG. 5C.

Figure 5C:
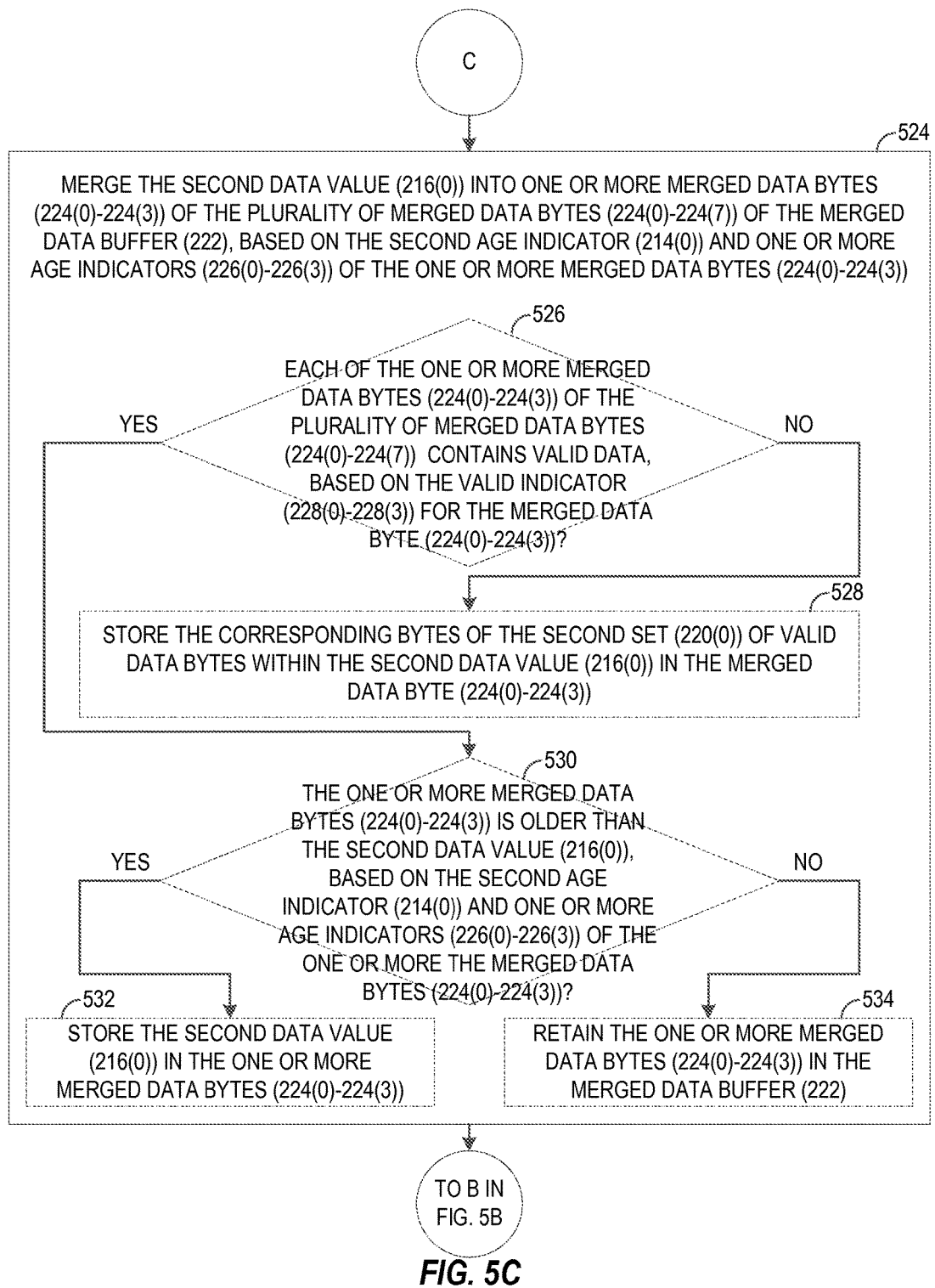

In FIG. 5C, the merging logic circuit 200 merges the second data value 216(0) into one or more merged data bytes 224(0)-224(3) of the plurality of merged data bytes 224(0)-224(7) of the merged data buffer 222, based on the second age indicator 214(0) and one or more age indicators 226(0)-226(3) of the one or more merged data bytes 224(0)-224(3) (block 524). The merging logic circuit 200 may thus be referred to herein as "a means for merging the second data value into the one or more merged data bytes of the plurality of merged data bytes of the merged data buffer, based on the second age indicator and one or more age indicators of the one or more merged data bytes." In some aspects, operations of block 524 for the merging logic circuit 200 merging the second data value 216(0) into the one or more merged data bytes 224(0)-224(3) may comprise the following operations. The merging logic circuit 200 may determine whether each of the one or more merged data bytes 224(0)-224(3) of the plurality of merged data bytes 224(0)-224(7) contains valid data, based on the valid indicator 228(0)-228(3) for the merged data byte 224(0)-224(3) (block 526). In this regard, the merging logic circuit 200 may be referred to herein as "a means for determining, based on a valid indicator for each of the one or more merged data bytes of the plurality of merged data bytes of the merged data buffer corresponding to the second set of one or more valid bytes within the second data value, whether the merged data byte contains valid data." It is to be understood that the merging logic circuit 200 makes this determination independently for each of the one or more merged data bytes 224(0)-224(3), and thus some of the merged data bytes 224(0)-224(3) may be determined to contain valid data while others may be determined to contain invalid data. If the merging logic circuit 200 determines that the one or more merged data bytes 224(0)-224(3) do not contain valid data, the merging logic circuit 200 may store the corresponding bytes of the second set 220(0) of valid data bytes within the second data value 216(0) in the merged data byte 224(0)-224(3) (block 528). Accordingly, the merging logic circuit 200 may be referred to herein as "a means for storing the corresponding byte of the second set of one or more valid bytes within the second data value in the merged data byte."

However, if the merging logic circuit 200 determines at decision block 526 that the one or more merged data bytes 224(0)-224(3) do contain valid data, the merging logic circuit 200 next determines whether the one or more merged data bytes 224(0)-224(3) is older than the second data value 216(0), based on the second age indicator 214(0) and one or more age indicators 226(0)-226(3) of the one or more merged data bytes 224(0)-224(3) (block 530). The merging logic circuit 200 may thus be referred to herein as "a means for determining, based on the second age indicator and the one or more age indicators of the one or more merged data bytes, whether the one or more merged data bytes is older than the second data value." If the one or more merged data bytes 224(0)-224(3) is older than the second data value 216(0), the merging logic circuit 200 may store the second data value 216(0) in the one or more merged data bytes 224(0)-224(3) (block 532). In this regard, the merging logic circuit 200 may be referred to herein as "a means for storing the second data value in the one or more merged data bytes." If the merging logic circuit 200 determines at decision block 530 that the second data value 216(0) is older than the one or more merged data bytes 224(0)-224(3), the merging logic circuit 200 may retain the one or more merged data bytes 224(0)-224(3) in the merged data buffer 222 (block 534). Processing then returns to block 514 of FIG. 5B, where the merging logic circuit 200 processes the remaining store queue entries 208(0)-208(X), if any.

Figure 5D:
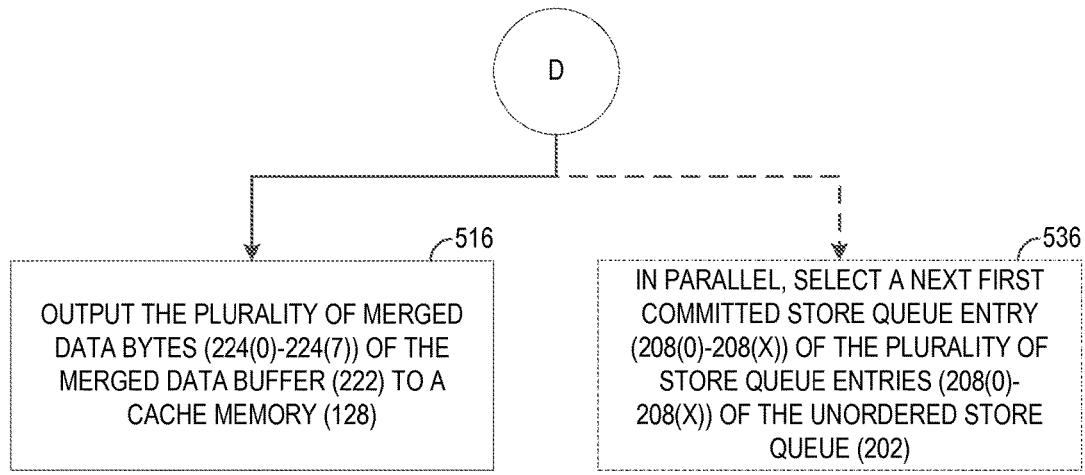

In FIG. 5D, the merging logic circuit 200 outputs the plurality of merged data bytes 224(0)-224(7) of the merged data buffer 222 to the cache memory 128 (block 516). Accordingly, the merging logic circuit 200 may be referred to herein as "a means for outputting the plurality of merged data bytes of the merged data buffer to a cache memory." In aspects in which the load/store unit 204 provides multiple banks 400(0)-400(Z) and corresponding bank-associated merging logic circuits 401(0)-401(Z), the arbiter circuit 402 of the merging logic circuit 200 may select one of the banks 400(0)-400(Z) from which to output the plurality of merged data bytes. In some aspects, the merging logic circuit 200, in parallel with the operations of block 516, may also select a next first committed store queue entry 208(0)-208(X) of the plurality of store queue entries 208(0)-208(X) of the unordered store queue 202 (block 536).

Providing coherent merging of store queue entries in unordered store queues of block-based computer processors according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a smart phone, a tablet, a phablet, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, and an automobile.

Figure 6:
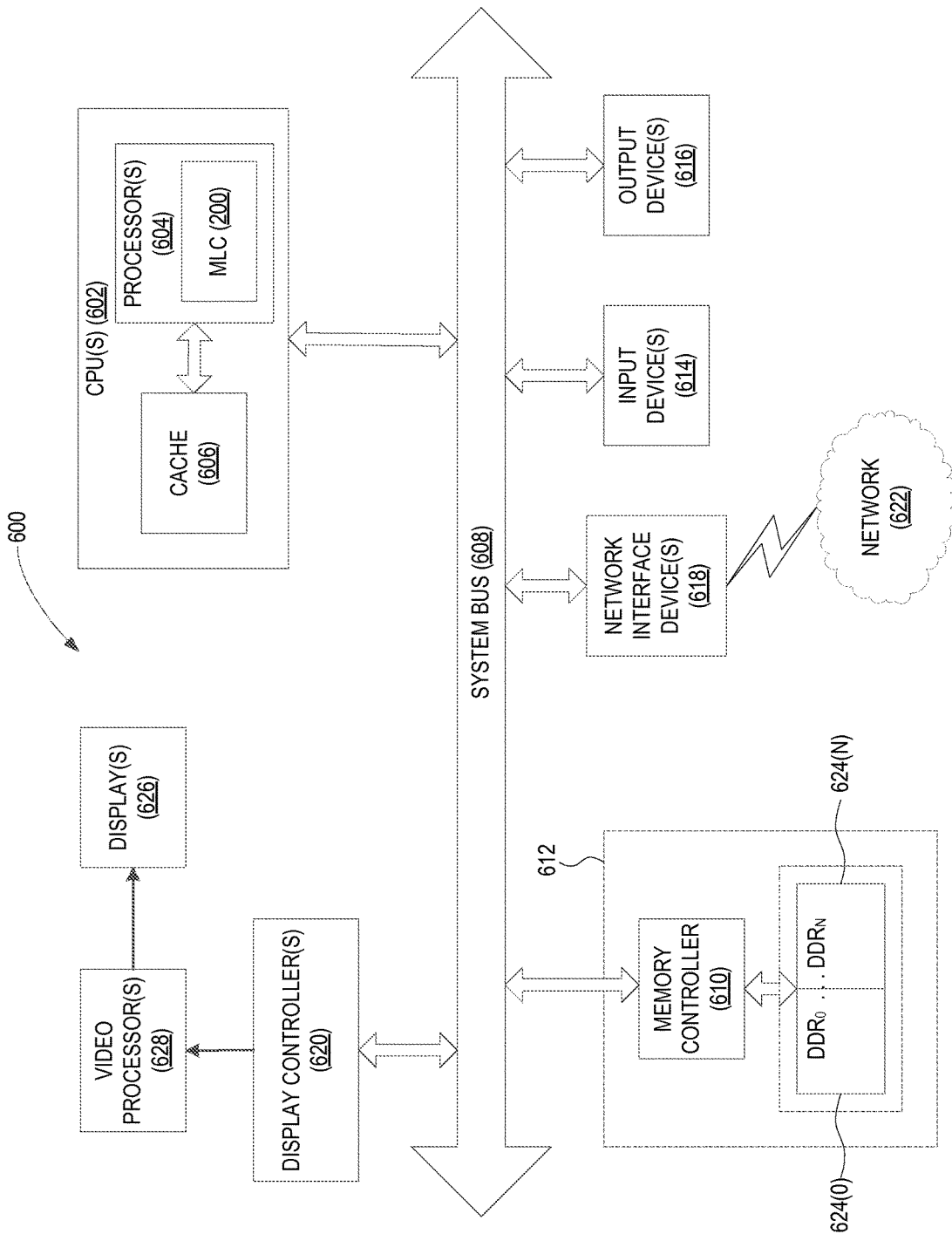
FIG. 6 is a block diagram of an exemplary processor-based system that can include the block-based computer processor of FIG. 1 and the merging logic circuit of FIG. 2.

In this regard, FIG. 6 illustrates an example of a processor-based system 600 that can employ the merging logic circuit (MLC) 200 illustrated in FIGS. 2 and 3A-3C. In this example, the processor-based system 600 includes one or more central processing units (CPUs) 602, each including one or more processors 604. The one or more processors 604 may comprise the block-based computer processor 100 of FIG. 1. The CPU(s) 602 may be a master device. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including but not limited to input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0-N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A block-based computer processor, comprising:
   a cache memory;
   an unordered store queue comprising a plurality of store queue entries; and
   a merging logic circuit communicatively coupled to and separate from the unordered store queue and the cache memory, comprising a merged data buffer for storing a plurality of merged data bytes;
   the merging logic circuit configured to:
      select a first committed store queue entry of the plurality of store queue entries of the unordered store queue;
      read a memory address, a first age indicator, and a first data value from the first committed store queue entry;
      store the first age indicator and the first data value in one or more merged data bytes of the plurality of merged data bytes of the merged data buffer;
      for each remaining committed store queue entry of the plurality of store queue entries of the unordered store queue having an identical memory address as the first committed store queue entry:
         read a second age indicator and a second data value from the remaining committed store queue entry; and
         merge the second data value into the one or more merged data bytes of the plurality of merged data bytes of the merged data buffer, based on a comparison of the second age indicator and one or more age indicators of the one or more merged data bytes; and
      output the plurality of merged data bytes of the merged data buffer to the cache memory.

2. The block-based computer processor of claim 1, wherein the merging logic circuit is further configured to:
   invalidate the first committed store queue entry after reading the memory address, the first age indicator, and the first data value from the first committed store queue entry; and
   invalidate each remaining committed store queue entry after reading the second age indicator and the second data value from the remaining committed store queue entry.

3. The block-based computer processor of claim 1, wherein the merging logic circuit is configured to merge the second data value into the one or more merged data bytes of the plurality of merged data bytes of the merged data buffer, based on the comparison of the second age indicator and the one or more age indicators of the one or more merged data bytes, by:
   determining, based on a comparison of the second age indicator and the one or more age indicators of the one or more merged data bytes, whether each merged data byte of the one or more merged data bytes is older than a corresponding byte of the second data value; and
   responsive to determining that the merged data byte is older than the corresponding byte of the second data value, storing the corresponding byte of the second data value in the merged data byte.

4. The block-based computer processor of claim 1, wherein:
   the merging logic circuit is configured to read the first data value by reading a first byte mask indicating a first set of one or more valid bytes within the first data value;
   the merging logic circuit is configured to store the first data value by setting a valid indicator of the one or more merged data bytes of the plurality of merged data bytes of the merged data buffer corresponding to the first set of one or more valid bytes within the first data value to indicate a valid state, based on the first byte mask;
   the merging logic circuit is configured to read the second data value by reading a second byte mask indicating a second set of one or more valid bytes within the second data value; and
   the merging logic circuit is further configured to merge the second data value into the one or more merged data bytes of the plurality of merged data bytes of the merged data buffer by:
      determining, based on the valid indicator for each of the one or more merged data bytes of the plurality of merged data bytes of the merged data buffer corresponding to the second set of one or more valid bytes within the second data value, whether the merged data byte contains valid data;
      responsive to determining that the merged data byte contains the valid data, merging a corresponding byte of the second set of one or more valid bytes within the second data value into the merged data byte, based on a comparison of the second age indicator and the age indicator of the merged data byte; and responsive to determining that the merged data byte does not contain the valid data, storing the corresponding byte of the second set of one or more valid bytes within the second data value in the merged data byte.

5. The block-based computer processor of claim 1, wherein the first age indicator and the second age indicator each comprises an indication of one or more of a phase, a core, and an instruction block.

6. The block-based computer processor of claim 1, wherein outputting the plurality of merged data bytes of the merged data buffer to the cache memory is performed in parallel with selecting a next first committed store queue entry of the plurality of store queue entries of the unordered store queue.

7. The block-based computer processor of claim 1, wherein the merging logic circuit is configured to select the first committed store queue entry of the plurality of store queue entries of the unordered store queue by selecting the first committed store queue entry corresponding to an oldest pending instruction block.

8. The block-based computer processor of claim 1, wherein:
the unordered store queue further comprises a plurality of banks; and
the merging logic circuit comprises a plurality of bank-associated merging logic circuits each associated with a bank of the plurality of banks;
the block-based computer processor further comprising an arbiter circuit configured to select a bank-associated merging logic circuit of the plurality of bank-associated merging logic circuits to output the plurality of merged data bytes to the cache memory.

9. The block-based computer processor of claim 1 integrated into an integrated circuit (IC).

10. The block-based computer processor of claim 1 integrated into a device selected from the group consisting of: a set top box; an entertainment unit; a navigation device; a communications device; a fixed location data unit; a mobile location data unit; a mobile phone; a cellular phone; a smart phone; a tablet; a phablet; a computer; a portable computer; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; and an automobile.

11. A block-based computer processor, comprising:
a means for selecting a first committed store queue entry of a plurality of store queue entries of an unordered store queue;
a means for reading a memory address, a first age indicator, and a first data value from the first committed store queue entry;
a means for storing the first age indicator and the first data value in one or more merged data bytes of a plurality of merged data bytes of a merged data buffer;
for each remaining committed store queue entry of the plurality of store queue entries of the unordered store queue having an identical memory address as the first committed store queue entry:
a means for reading a second age indicator and a second data value from the remaining committed store queue entry; and a means for merging the second data value into the one or more merged data bytes of the plurality of merged data bytes of the merged data buffer, based on a comparison of the second age indicator and one or more age indicators of the one or more merged data bytes; and
a means for outputting the plurality of merged data bytes of the merged data buffer to a cache memory.

12. The block-based computer processor of claim 11, further comprising:
a means for invalidating the first committed store queue entry after reading the memory address, the first age indicator, and the first data value from the first committed store queue entry; and
a means for invalidating each remaining committed store queue entry after reading the second age indicator and the second data value from the remaining committed store queue entry.

13. The block-based computer processor of claim 11, wherein the means for merging the second data value into the one or more merged data bytes of the plurality of merged data bytes of the merged data buffer, based on the comparison of the second age indicator and the one or more age indicators of the one or more merged data bytes, comprises:
a means for determining, based on a comparison of the second age indicator and the one or more age indicators of the one or more merged data bytes, whether each merged data byte of the one or more merged data bytes is older than a corresponding byte of the second data value; and
a means for storing the corresponding byte of the second data value in the merged data byte, responsive to determining that the merged data byte is older than the corresponding byte of the second data value.

14. The block-based computer processor of claim 11, wherein:
the means for reading the first data value comprises a means for reading a first byte mask indicating a first set of one or more valid bytes within the first data value;
the means for storing the first data value comprises a means for setting a valid indicator of the one or more merged data bytes of the plurality of merged data bytes of the merged data buffer corresponding to the first set of one or more valid bytes within the first data value to indicate a valid state, based on the first byte mask;
the means for reading the second data value comprises a means for reading a second byte mask indicating a second set of one or more valid bytes within the second data value; and
the means for merging the second data value into the one or more merged data bytes of the plurality of merged data bytes of the merged data buffer further comprises:
a means for determining, based on the valid indicator for each of the one or more merged data bytes of the plurality of merged data bytes of the merged data buffer corresponding to the second set of one or more valid bytes within the second data value, whether the merged data byte contains valid data;
a means for merging a corresponding byte of the second set of one or more valid bytes within the second data value into the merged data byte based on a comparison of the second age indicator and the age indicator of the merged data byte, responsive to determining that the merged data byte contains the valid data; and
a means for storing the corresponding byte of the second set of one or more valid bytes within the second data value in the merged data byte, responsive to determining that the merged data byte does not contain the valid data.

15. The block-based computer processor of claim 11, wherein the first age indicator and the second age indicator each comprises an indication of one or more of a phase, a core, and an instruction block.

16. The block-based computer processor of claim 11, wherein the means for outputting the plurality of merged data bytes of the merged data buffer to the cache memory is configured to operate in parallel with a means for selecting a next first committed store queue entry of the plurality of store queue entries of the unordered store queue.

17. The block-based computer processor of claim 11, wherein the means for selecting the first committed store queue entry of the plurality of store queue entries of the unordered store queue comprises a means for selecting the first committed store queue entry corresponding to an oldest pending instruction block.

18. A method for coherently merging committed store queue entries in an unordered store queue of a block-based computer processor, comprising:
selecting a first committed store queue entry of a plurality of store queue entries of the unordered store queue;
reading a memory address, a first age indicator, and a first data value from the first committed store queue entry;
storing the first age indicator and the first data value in one or more merged data bytes of a plurality of merged data bytes of a merged data buffer;
for each remaining committed store queue entry of the plurality of store queue entries of the unordered store queue having an identical memory address as the first committed store queue entry:
reading a second age indicator and a second data value from the remaining committed store queue entry; and
merging the second data value into the one or more merged data bytes of the plurality of merged data bytes of the merged data buffer, based on a comparison of the second age indicator and one or more age indicators of the one or more merged data bytes; and
outputting the plurality of merged data bytes of the merged data buffer to a cache memory.

19. The method of claim 18, further comprising:
invalidating the first committed store queue entry after reading the memory address, the first age indicator, and the first data value from the first committed store queue entry; and
invalidating each remaining committed store queue entry after reading the second age indicator and the second data value from the remaining committed store queue entry.

20. The method of claim 18, wherein merging the second data value into the one or more merged data bytes of the plurality of merged data bytes of the merged data buffer, based on the comparison of the second age indicator and the one or more age indicators of the one or more merged data bytes, comprises:
determining, based on a comparison of the second age indicator and the one or more age indicators of the one or more merged data bytes, whether each merged data byte of the one or more merged data bytes is older than a corresponding byte of the second data value; and
responsive to determining that the merged data byte is older than the corresponding byte of the second data value, storing the corresponding byte of the second data value in the merged data byte.

21. The method of claim 18, wherein:
reading the first data value comprises reading a first byte mask indicating a first set of one or more valid bytes within the first data value;
storing the first data value comprises setting a valid indicator of the one or more merged data bytes of the plurality of merged data bytes of the merged data buffer corresponding to the first set of one or more valid bytes within the first data value to indicate a valid state, based on the first byte mask;
reading the second data value comprises reading a second byte mask indicating a second set of one or more valid bytes within the second data value; and
merging the second data value into the one or more merged data bytes of the plurality of merged data bytes of the merged data buffer further comprises:
determining, based on a valid indicator for each of the one or more merged data bytes of the plurality of merged data bytes of the merged data buffer corresponding to the second set of one or more valid bytes within the second data value, whether the merged data byte contains valid data;
responsive to determining that the merged data byte contains the valid data, merging a corresponding byte of the second set of one or more valid bytes within the second data value into the merged data byte based on a comparison of the second age indicator and the age indicator of the merged data byte; and
responsive to determining that the merged data byte does not contain the valid data, storing the corresponding byte of the second set of one or more valid bytes within the second data value in the merged data byte.

22. The method of claim 18, wherein the first age indicator and the second age indicator each comprises an indication of one or more of a phase, a core, and an instruction block.

23. The method of claim 18, wherein outputting the plurality of merged data bytes of the merged data buffer to the cache memory is performed in parallel with selecting a next first committed store queue entry of the plurality of store queue entries of the unordered store queue.

24. The method of claim 18, wherein selecting the first committed store queue entry of the plurality of store queue entries of the unordered store queue comprises selecting the first committed store queue entry corresponding to an oldest pending instruction block.

\* \* \* \* \*